United States Patent [19]

Hirano

[11] Patent Number: 5,640,604
[45] Date of Patent: Jun. 17, 1997

[54] BUFFER REALLOCATION SYSTEM

[75] Inventor: Keizo Hirano, Kawasaki, Japan

[73] Assignee: Fujitsu Limited, Kanagawa, Japan

[21] Appl. No.: 297,621

[22] Filed: Aug. 29, 1994

[30] Foreign Application Priority Data

Mar. 16, 1994 [JP] Japan ................................ 6-046193

[51] Int. Cl.$^6$ ............................................ G06F 12/02
[52] U.S. Cl. .......................................................... 395/876
[58] Field of Search .................................. 395/250, 650, 395/876, 873, 463, 487, 877

[56] References Cited

U.S. PATENT DOCUMENTS

| | | | |
|---|---|---|---|
| 4,638,424 | 1/1987 | Beglin et al. | 395/444 |
| 5,093,912 | 3/1992 | Dong et al. | 395/650 |
| 5,247,674 | 9/1993 | Kogure | 395/650 |
| 5,303,347 | 4/1994 | Gagne et al. | 395/250 |
| 5,386,536 | 1/1995 | Courts et al. | 395/463 |
| 5,390,299 | 2/1995 | Rege et al. | 395/200.2 |

FOREIGN PATENT DOCUMENTS 2-14644  1/1990  Japan .

*Primary Examiner*—Jack B. Harvey
*Assistant Examiner*—Xuong M. Chung-Trans
*Attorney, Agent, or Firm*—Helfgott & Karas, P.C.

[57] ABSTRACT

A buffer is acquired from a buffer storage area when the system is started up. The buffer allocated to a program requiring a use of a buffer is monitored so that a reallocation is performed when the buffer count becomes smaller than a predetermined threshold value.

9 Claims, 9 Drawing Sheets

| DAY OF MONTH | DAY OF WEEK | TIME OF DAY | MAXIMUM BUFFER COUNT USED IN TIME ZONE | | |
|---|---|---|---|---|---|
| | | | MAIN MEMORY | EXTRA MEMORY 1 | EXTRA MEMORY 2 |
| 1 | MONDAY | 0 1 | 2 | 0 | 0 |
| | | 0 2 | 1 | 0 | 0 |
| | | 0 3 | 1 | 0 | 0 |
| | | ⋮ | ⋮ | ⋮ | ⋮ |
| | | 2 4 | 8 | 5 | 2 |
| ⋮ | ⋮ | ⋮ | ⋮ | ⋮ | ⋮ |
| 7 | SUNDAY | 0 1 | 2 | 0 | 0 |
| | | 0 2 | 1 | 0 | 0 |
| | | ⋮ | ⋮ | ⋮ | ⋮ |
| | | 2 4 | 7 | 4 | 1 |
| ⋮ | ⋮ | ⋮ | ⋮ | ⋮ | ⋮ |
| 3 1 | WEDNESDAY | 0 1 | 3 | 1 | 0 |
| | | 0 2 | 2 | 0 | 0 |
| | | ⋮ | ⋮ | ⋮ | ⋮ |
| | | 2 4 | 1 0 | 6 | 3 |

BUFFER REALLOCATION SYSTEM

BACKGROUND OF THE INVENTION (1) Field of the Invention

The present invention relates to buffer reallocation systems, and more particularly to a buffer reallocation system in which the count of buffers used is set such that the count is optimized for the execution of a process.

Recently, the scale of software used in a system has become larger, thus generating a demand that the physically limited memory resource is utilized more efficiently. For example, there is a demand for a system capable of reducing the size of an idle resource by, for example, allocating unused memory resource to frequently used software, thereby eliminating a need to add new memory resource for the frequently used software.

(2) Description of the Prior Art

Conventionally, the count of buffers remains fixed once a system designer determines an appropriate count thereof on the basis of past experience or the result of system calculations, by referring to the processing capability, processing time and processing requirement, and by executing software or performing calculations accordingly. In case the count of buffers is set in the above manner, software must be modified and the corresponding count of buffers must be set, when a test is being executed or when a failure occurs due to the insufficient count of buffers.

There is proposed a method whereby the usage of buffers is monitored and, when the count of buffers used exceeds a buffer usage threshold level that has been predetermined at the system initialization, a warning message is displayed in an operator console so that a degradation in the system performance is prevented (Japanese Laid-Open Patent Application No. 1-295300).

Another method of preventing a degradation in the system performance is such that, when the count of buffers used exceeds the threshold level, a flag is set so as to inform the system of the occurrence of the excess, whereupon the count of buffers used is restricted to be below the threshold level by thinning out the data to be processed (Japanese Laid-Open Patent Application 2-14644). There is another method in which a reduction in the storage capacity or an overload is prevented by halting a process having a lower priority or by temporarily storing data in another storage means (Japanese Patent Application No. 4-225377).

However, the conventional methods mentioned above generally depend on the experience of the designer. Since the buffer count is increased or decreased on the basis of the past results of buffer count calculations. Hence, there is a great dependence on the personal skill of the designer.

In a method in which calculations and software are used to determine the count of buffers, it is difficult to arrive upon a proper count from the start. Since the count of buffers once determined is fixed in the system, there may occur a system down due to an insufficient buffer count while software is being executed or there may occur an increase in the time period in which no processings are performed and in which the system has to wait for an acquisition of a buffer. Moreover, it takes a long measuring time before a conclusion that an insufficiency in the buffer count is a cause of a malfunction is arrived at. It takes even more time to perform a reacquisition of a buffer so as to remedy the insufficiency of the buffer count.

The method whereby the operator is warned that the buffer count exceeds the predetermined threshold level certainly eliminates a need to perform measurements in order to arrive at a conclusion that the system down has occurred due to an insufficiency in the count of buffers. However, since this method only displays an alarm message for an operator to observe, the designer is required to perform an operation for reacquiring a buffer.

The method whereby the data to be processed is thinned out when the threshold level is exceeded has a drawback that it imposes a restriction on the volume of data to be processed. This may cause a failure to occur in the case of an operation (such as a statistical processing) in which an accurate result cannot be arrived at without a large amount of data. Moreover, a predetermination is necessary as to which data is to be thinned out. The method whereby a process having a low priority is halted or the data is temporarily stored in another storage means may cause the user to misunderstand that no process is being executed since the halting process or the storing process imposes a long wait time. The user may then repeats a request for an execution, and this causes the number of queues on the system to increase.

As has been described, the conventional technology has a problem that it is difficult to use limited memory resource efficiently, and that a determination as to an optimum count of buffers is arrived at only after the system down due to an insufficient buffer count has occurred or after a failure such as an increase in the period of time in which a program requiring a buffer acquisition is not executed has occurred due to a wait time imposed before a buffer is acquired.

SUMMARY OF THE INVENTION

Accordingly, a general object of the present invention is to provide a buffer reallocation system in which it is possible to determine an optimum buffer count so that a system failure or a problem with the performance, which failure or problem is due to an inappropriate allocation of the buffer count at the initial design stage and a consequent insufficiency in the buffer count, can be eliminated.

A more specific object of the present invention is to provide a buffer reallocation system in which it is possible to acquire an additional buffer when an insufficiency in the buffer count for the program which requested a use of a buffer is encountered during the execution of processes of the program.

Another object of the present invention is to provide a buffer reallocation system in which it is possible to refer, when the system is initialized, to a maximum buffer count that can be used by each of the programs requiring a use of a buffer.

In order to achieve the above objects, the present invention provides a buffer reallocation system for allocating a buffer to a plurality of programs requiring a use of a buffer, the buffer reallocation system comprising: buffer storing means having a plurality of buffers; buffer access authorizing/surrendering means for surrendering, in response to a request for a use of a buffer from the program requiring a use of a buffer, a buffer of the buffer storing means to the program requiring a use of a buffer; buffer count monitoring means which monitors the number of used and unused buffer areas in the buffer storing means, checks to see if a buffer corresponding to a buffer usage request from the program requiring a use of a buffer exists in the buffer storing means, issues a buffer allocation enable notification when it exists, issues, when it does not exist, an allocation enable notification after searching another buffer storing means for a buffer adapted for the buffer usage request and finding one, confirming the count of the allocated buffers, and issues a notification for reacquiring a buffer from another type of buffer storing means; buffer acquisition means for acquiring a buffer from the buffer storing means in response to a receipt of a buffer allocation notification from the buffer count monitoring means; and buffer acquisition history storing means for storing a maximum buffer count used by each of the plurality of programs requiring a use of a buffer which acquires a buffer, through the buffer acquisition means.

According to the buffer reallocation system of the present invention, buffers are initially acquired at the initial set-up of the system or at the power-on of the system and are stored in a buffer storage area. In response to a request by a program requiring a use of a buffer, the buffer storage area is searched for an unused buffer so that a buffer allocation is performed. When it is impossible to acquire a buffer from a main memory, an unused main memory area is reacquired as a buffer. When there is no unused area in the main memory, another unused buffer is surrendered to the program requiring a use of a buffer. Thus, a stable use of buffers is possible by reallocating available buffers to programs that have encountered an insufficiency in the buffer count. In another aspect of the present invention, the buffers that are initially allocated to the programs that require a buffer are monitored so that it is ensured that a buffer reallocation can be carried out again when the count of a buffer has become smaller than the threshold level. The function of storing the history of acquisition of buffers checks the usage of buffers by each of the programs requiring a buffer, the maximum buffer counts in correspondence to the day of the month, day of the week and the time being stored as history information. In this way, it is possible to make an allocation of a buffer during a time zone in which the buffer is least frequently used and to execute a program properly.

Preferably, a maximum buffer count used is stored in a non-volatile memory so that the information will not be lost even when there is a power failure or when a malfunction occurs. In this way, the system can always refer to the maximum buffer count at the initial state such as at the system start-up, before performing a buffer acquisition process.

In another preferred embodiment of the present invention, when a request for a use of a buffer is issued by a program, the system refers to a buffer acquisition time t which elapses between acquisitions of a buffer, and intervals T between requests for a use of a buffer. If it is found that the relationship $t < T$ occurs an arbitrary number of times, it is possible to reacquire a buffer during a safety time zone in which a request for a use of a buffer is not issued during the buffer acquisition.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENT

Figure 1:
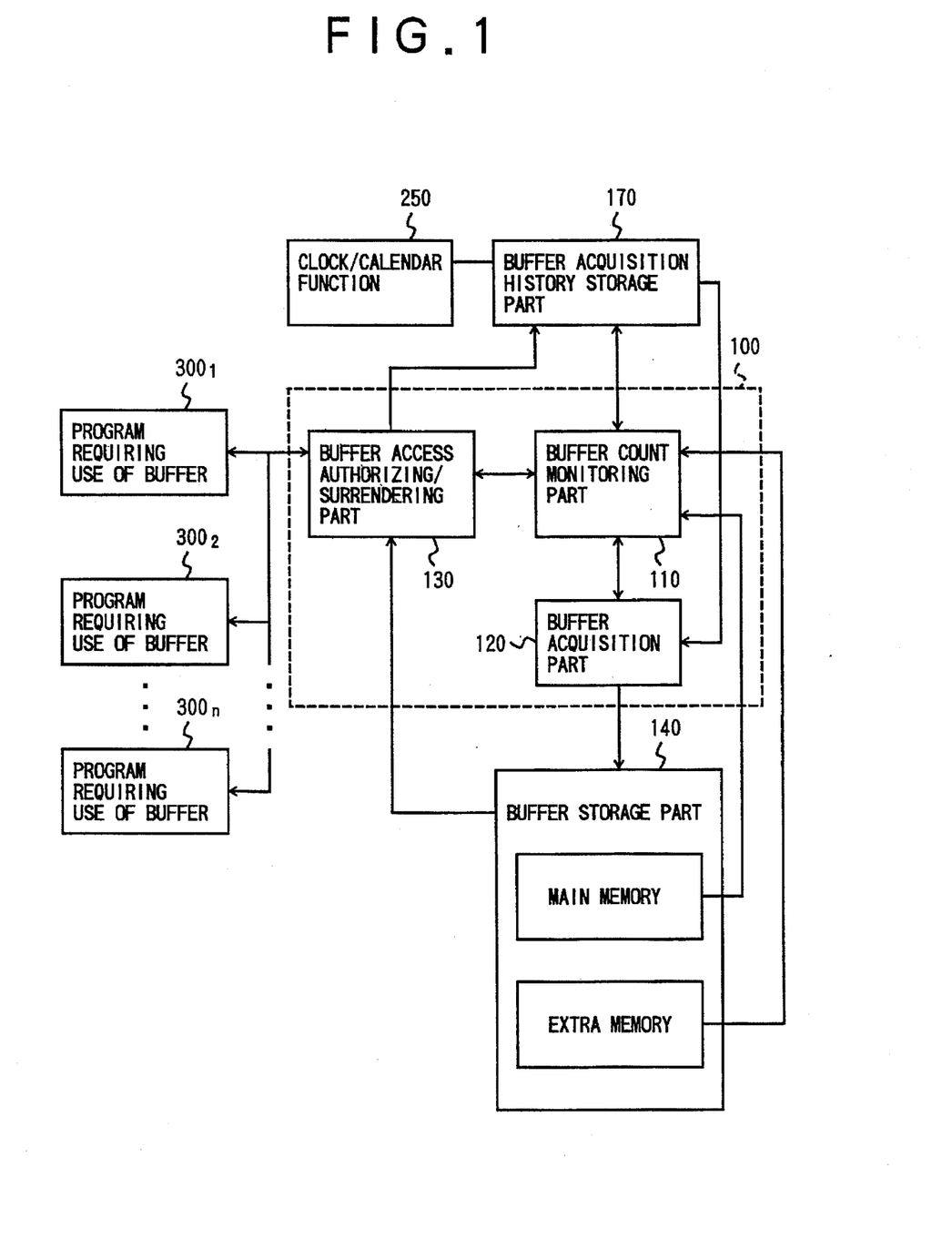
FIG. 1 is a diagram showing the principle and construction of the present invention.

FIG. 1 shows a buffer reallocation system for allocating a buffer to a plurality of programs 300 requiring a use of a buffer. Referring to FIG. 1, the buffer reallocation system comprises: buffer storage part 140 having a plurality of buffers; buffer access authorizing/surrendering part 130 for surrendering, in response to a request for a use of a buffer from the program 300 requiring a use of a buffer, a buffer of the buffer storage part 140 to the program requiring a use of a buffer; buffer count monitoring part 110 which monitors the number of used and unused buffer areas in the buffer storage part 140, checks to see if a buffer corresponding to a buffer usage request from the program 300 requiring a use of a buffer exists in the buffer storage part 140, issues a buffer allocation enable notification when it exists, issues, when it does not exist, an allocation enable notification after searching another buffer storage part 140 for a buffer adapted for the buffer usage request and finding one, confirming the count of the allocated buffers, and issues a notification for reacquiring a buffer from another type of buffer storage part 140; buffer acquiring part 120 for acquiring a buffer from the buffer storage part 140 in response to a receipt of a buffer allocation notification from the buffer count monitoring part 110; and buffer acquisition history storage part 170, embodied by a non-volatile memory, for storing a maximum buffer count used by each of the plurality of programs 300 requiring a use of a buffer which acquires a buffer, through the buffer acquisition part.

A description will now be given of an embodiment of the present invention.

Figure 2:
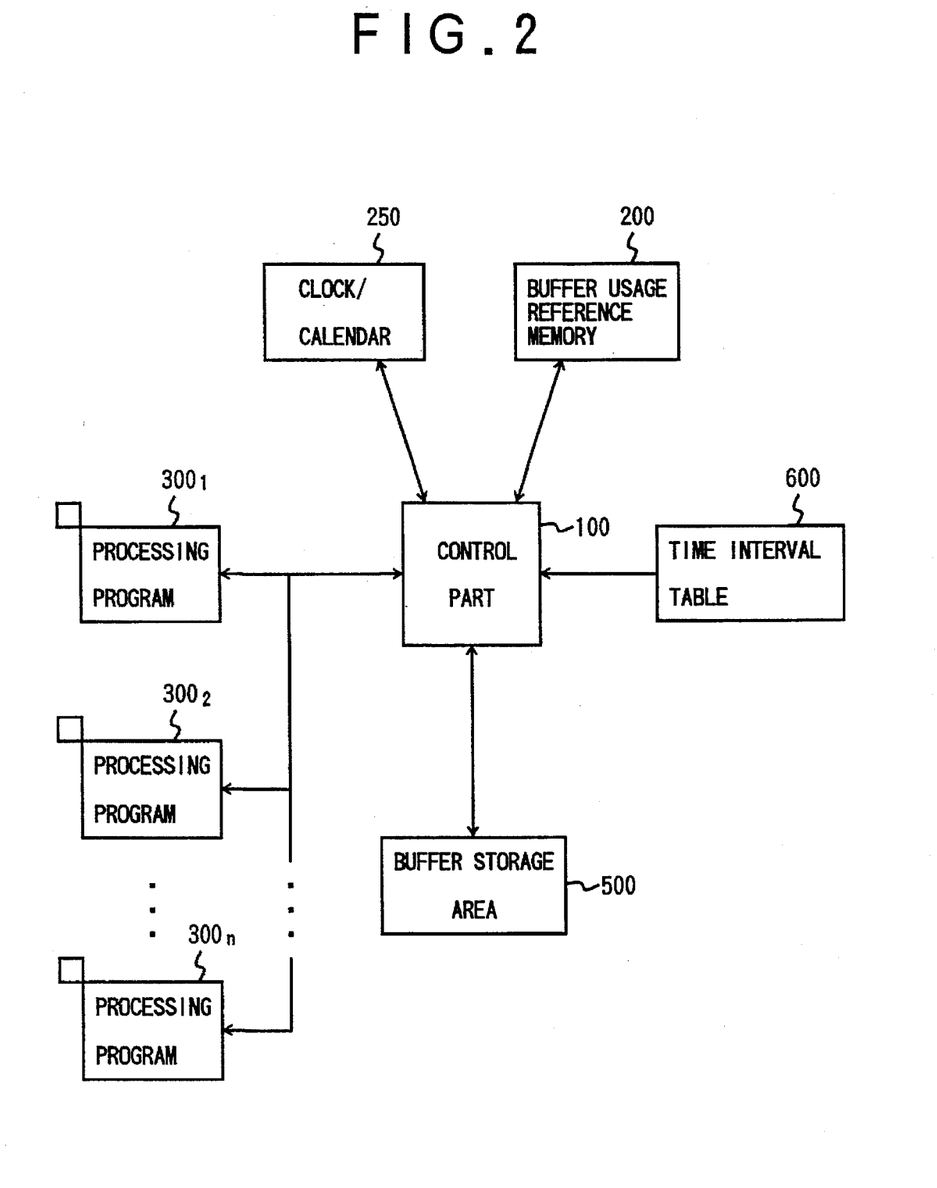
FIG. 2 is a diagram showing the system construction of an embodiment of the present invention.

FIG.2 shows the system construction of a buffer control system according to the embodiment. The buffer control system comprises: a control part 100; a buffer usage reference memory 200 which is a non-volatile memory for storing a maximum buffer count used; a clock/calendar function 250; programs $300_1, 300_2, \ldots 300_n$ requiring a use of a buffer which program issues a request for a use of a buffer (hereinafter, the program requiring a use of a buffer may be generically referred to as the program 300); a buffer storage area 500 for storing acquired buffers; and a time interval table 600 which holds the time of day when the system was started and the time of day when requests for a buffer were issued by the programs $300_1, 300_2, \ldots 300_n$.

Figure 3:
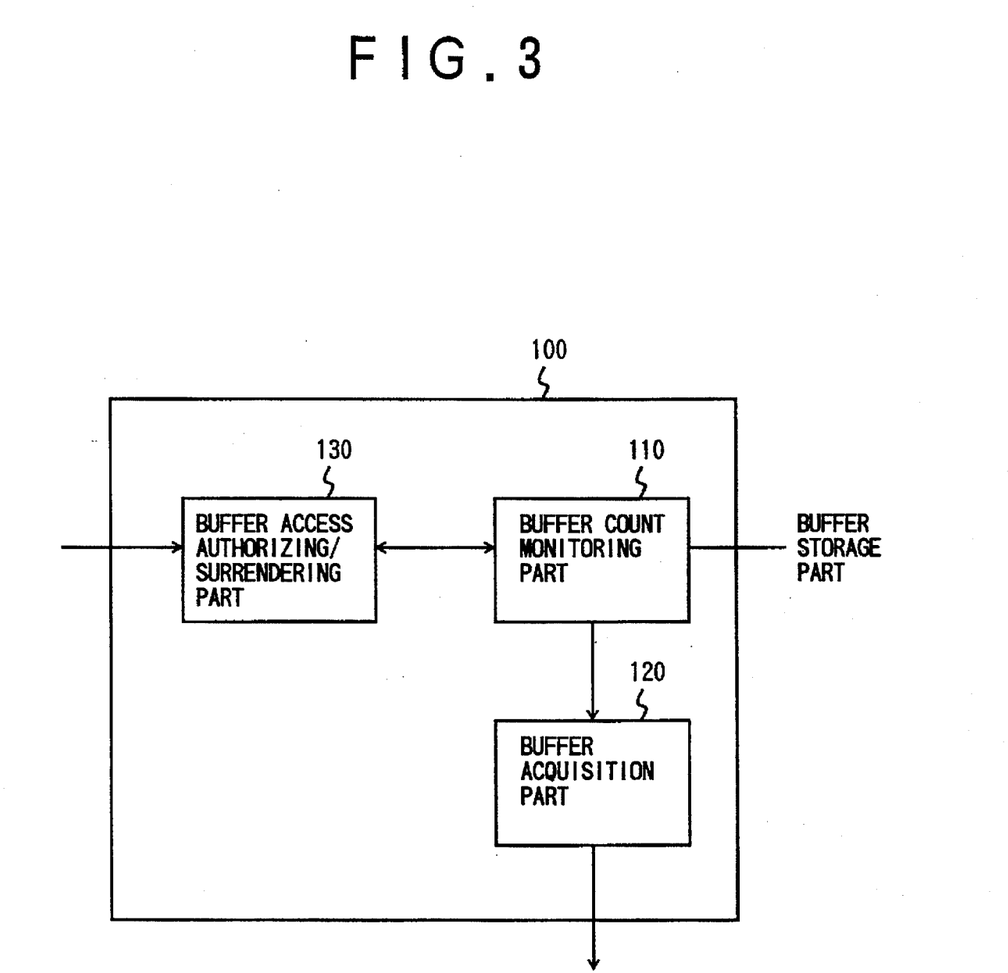
FIG. 3 is a diagram showing the construction of a control part of the embodiment.

FIG.3 shows the construction of the control part 100 of the embodiment. The control part 100 comprises: a buffer count monitoring part 110; a buffer acquiring part 120; a buffer access authorizing/surrendering part 130.

The buffer access authorizing/surrendering part 130 receives a request for a use of a buffer from the program 300 requiring a use of a buffer, and authorizes the program 300 that has issued the request to use a buffer acquired by the buffer acquiring part 120 in the buffer storage area 500. When there is a request for a buffer from the program 300 requiring a use of a buffer, the buffer access authorizing/surrendering part 130 uses the clock/calendar function 250 to notify the buffer usage reference memory 200 of the time of day when the request was issued. When a buffer is acquired by means of the buffer acquiring part 120, the buffer access authorizing/surrendering part 130 compares the maximum buffer count stored in the buffer usage reference memory 200 as history, with the count of buffers actually acquired. When the count of the newly acquired buffers exceeds the maximum buffer count, the information contained in the buffer usage reference memory 200 is updated.

The buffer count monitoring part 110 monitors the count of used and unused buffer areas in the buffer storage area 500. When a buffer usage request is issued by the program 300 requiring a use of a buffer, the buffer storage area 500 is referred to so as to determine if a buffer having a sufficient buffer size is available. If there is a buffer that can be acquired from the buffer storage area 500, the buffer count monitoring part 110 issues a buffer acquisition enable notification to the buffer acquiring part 120.

When the buffer acquiring part 120 is notified by the buffer count monitoring part 110 that there is a buffer that can be assigned to the program 300 requiring a use of a buffer, the buffer acquiring part 120 assigns the buffer to the program 300.

Figure 4:
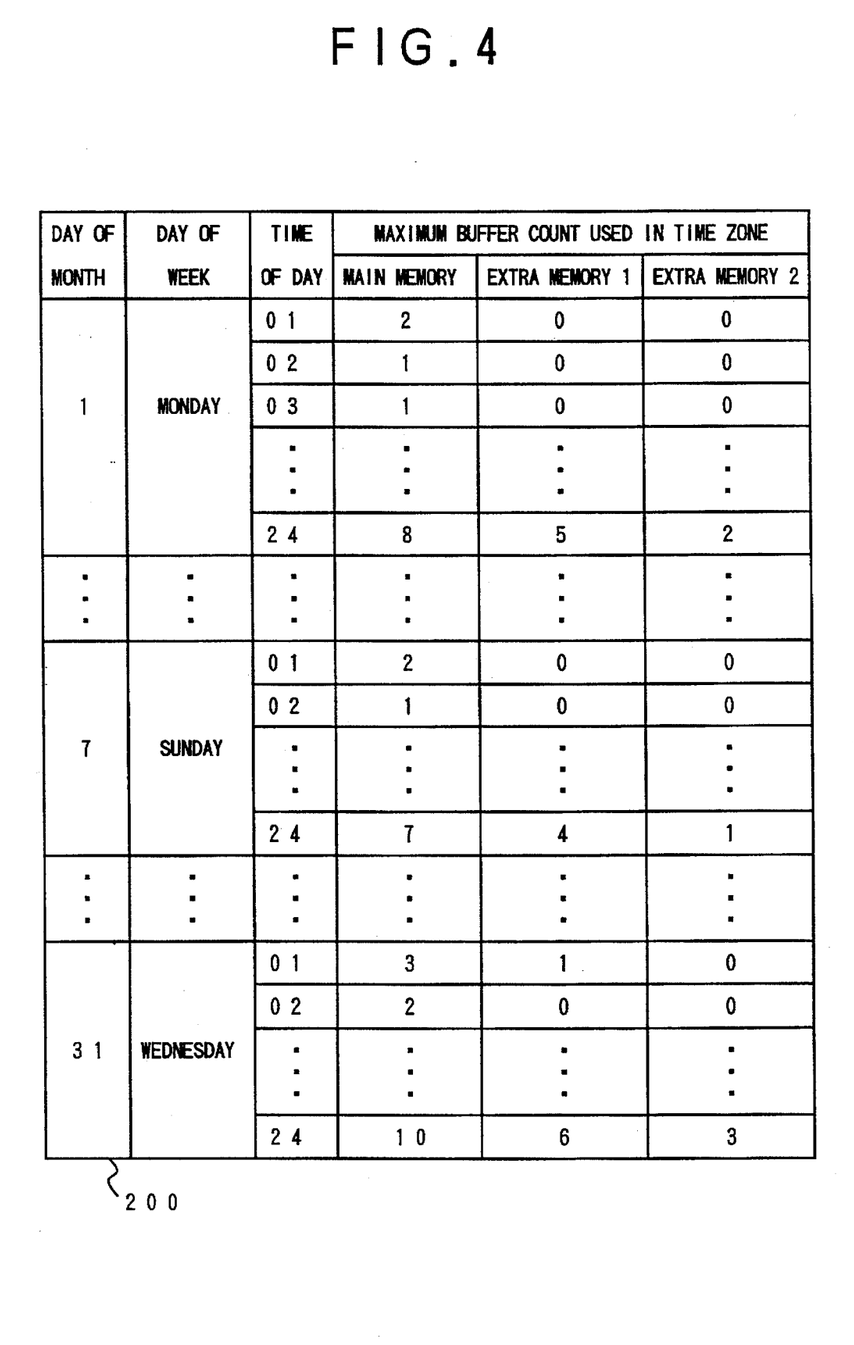
FIG. 4 is a table tabulating the usage of buffers in the embodiment, the table being contained in a buffer reference memory.

The buffer usage reference memory 200 stores a buffer usage table containing the maximum buffer count used, the table being provided for each program 300 requiring a use of a buffer. FIG. 4 shows an example of a buffer usage table in the buffer usage reference memory 200 of the embodiment. Referring to the example shown, maximum buffer counts used are tabulated with respect to the day of the month, the day of the week, and the time of the day, the table of FIG. 4 being provided for each of the programs $300_1$, $300_2 \ldots 300_n$ (see FIG. 2). For example, the maximum buffer count used (main memory) at 1 a.m., Monday, the 1st day of the month is 2, while the maximum buffer count used (main memory) at 24 p.m of the same day is 8. The maximum buffer count used at 24 p.m., Wednesday, the 7th day of the month is 10. In this example, it will be noted that the usage of buffers reaches a peak at 24 p.m.

Figure 5:
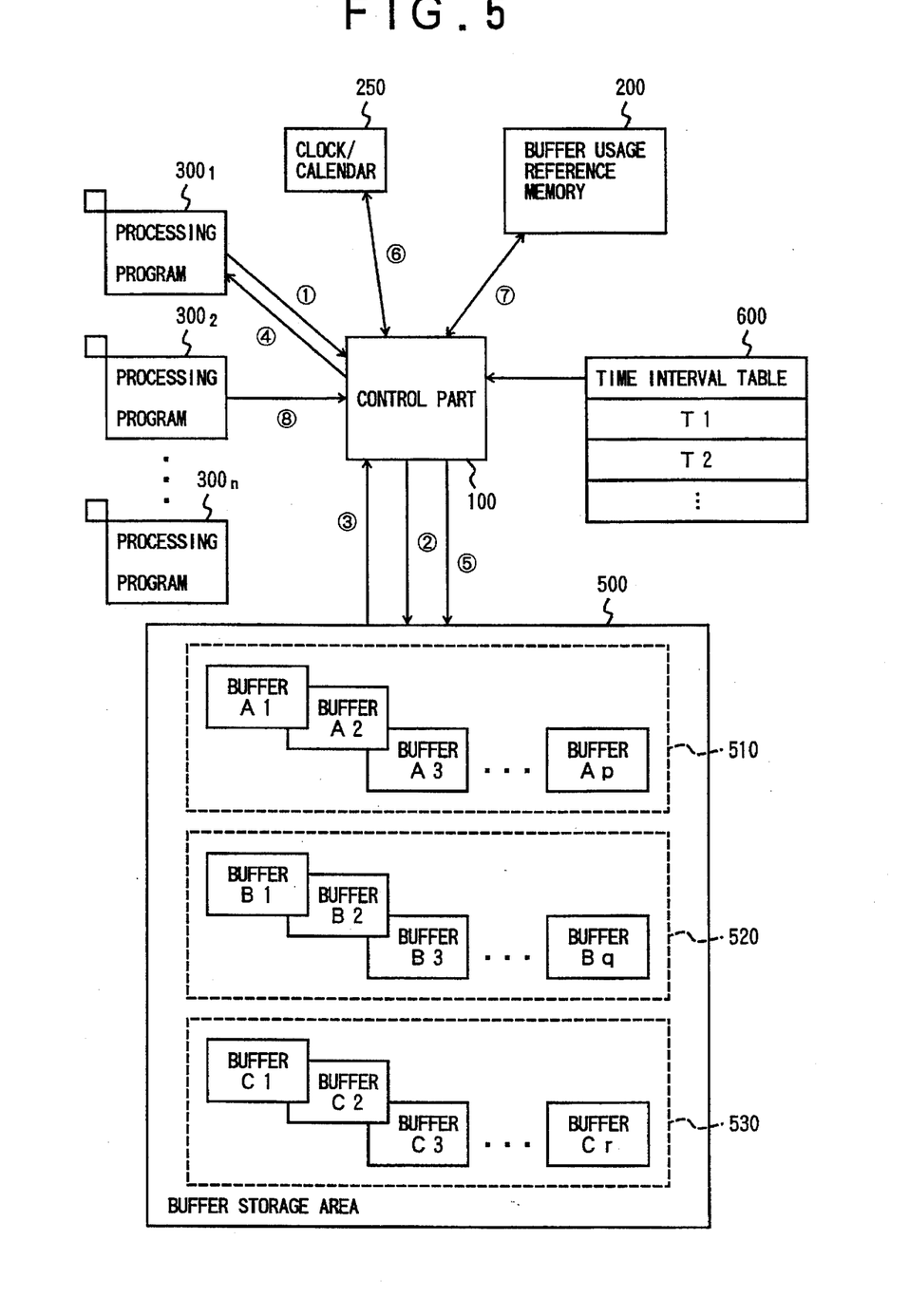
FIG. 5 is diagram explaining the processing operation of the embodiment.
Figure 6:
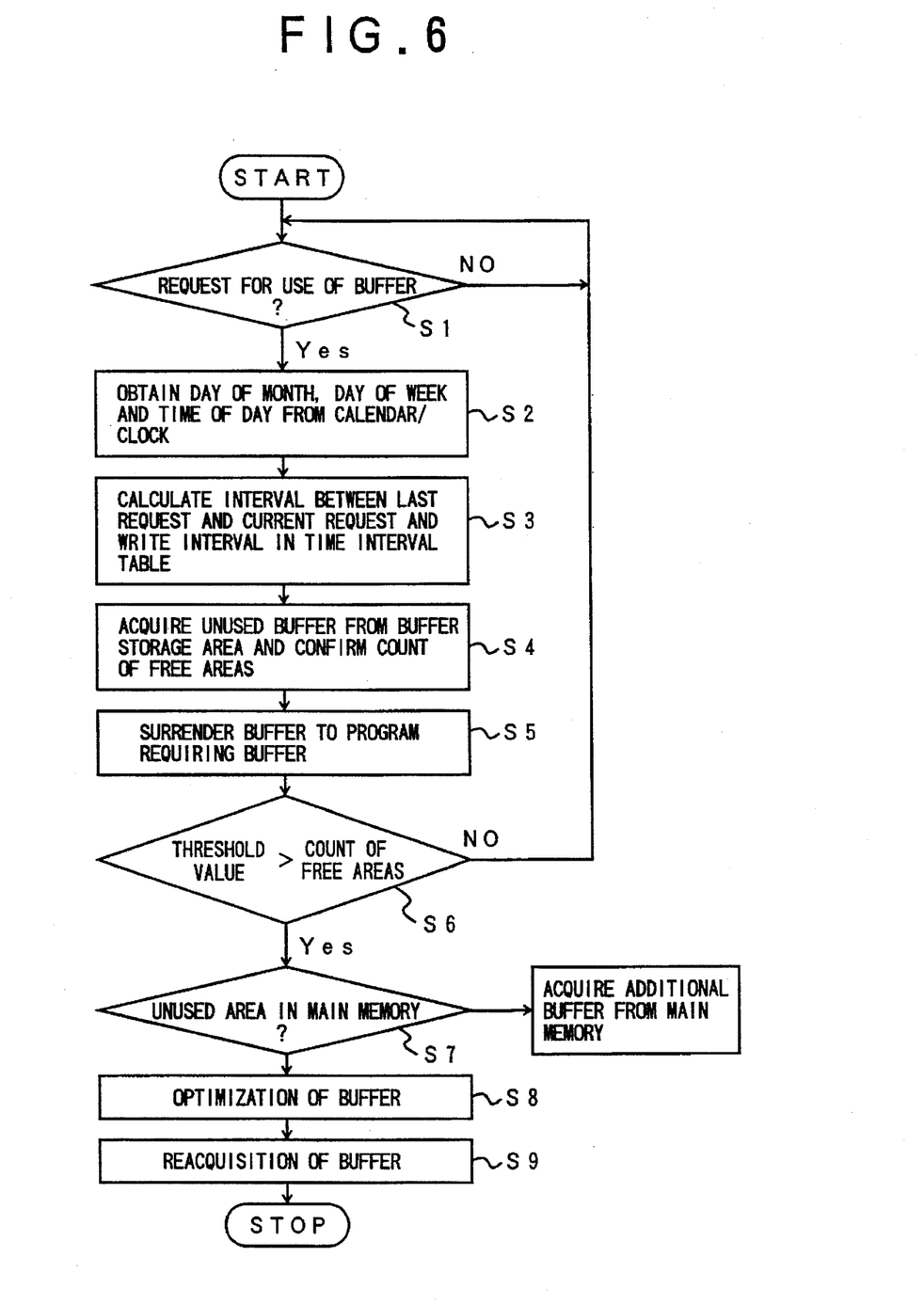
FIG. 6 is a flowchart for the processing operation of the embodiment.

FIG. 5 is a diagram explaining the processing operation of the embodiment; and FIG. 6 is a flowchart of the processing operation of the embodiment. The encircled numerals of FIG. 5 correspond to the numerals of FIG. 6 denoting steps of the processing operation. Referring to FIG. 5, when there is no unused buffer available in a main memory 510, a buffer is acquired from a first extra memory 520 or a second extra memory 530. The following is an explanation of the steps shown in FIG. 6.

Step 1) The program 300 requiring a use of a buffer issues a request for a use of a buffer to the control part 100.

Step 2) The buffer access authorizing/surrendering part 130 of the control part 100 accepts the request for a use of a buffer from the program 300 requiring a use of a buffer.

Step 3) The buffer access authorizing/surrendering part 130 records, in the time interval table 600, the time information acquired from the clock/calendar function 250 and the interval between the time of day when the current request occurred and the time of day when the last request occurred.

Step 4) The buffer count monitoring part 110 searches the buffer storage area 500 for an unused buffer suitable for the request by the program 300, and, when there is an unused buffer, notifies the buffer acquiring part 120 that the unused buffer can be acquired. The buffer count monitoring part 110 confirms the count of free buffer areas thus acquired.

Step 5) The buffer access authorizing/surrendering part 130 surrenders the buffer acquired by means of the buffer acquiring part 120 to the program 300 that issued the request for a use of a buffer.

Step 6) The buffer count monitoring part 110 monitors the buffer count and size of the free area of the buffer storage area 500, acquired and used by the program 300 through the step 4. The buffer count monitoring part 110 compares the buffer count with a threshold value $\underline{a}$.

Step 7) When it is found, as a result of the comparison, that the count of the free area of the acquired buffer is smaller than the threshold value $\underline{a}$, the buffer count monitoring part 110 determines that the buffer used by the program 300 is running out of a free area, and checks to see if there is an area available in the main memory 510. When there is an area available, the buffer count monitoring part 110 notifies the buffer acquiring part 120 that there is an area available in the main memory 510. The buffer acquiring part 120 acquires an additional buffer from the main memory 510 and stores the acquired buffer in the buffer storage area 500. When there is no area available in the main memory 510, the processing operation proceeds to a step 8.

Step 8) The buffer count monitoring part 110 executes a buffer optimization when there is no area available in the main memory 510. The buffer count monitoring part 110 retrieves maximum buffer counts used in the first and second extra memories 520 and 530, by referring to the buffer usage frequency table (FIG. 4) of the buffer usage reference memory 200. When it is found that currently used buffer count is greater than the maximum buffer counts used in either of the extra memories as a result of a comparison, the buffer counts for the relevant extra memory which size is stored in the buffer usage reference table is updated.

Step 9) When it is found, by referring to the time interval table 600, that an interval between requests for a use of a buffer is found to be longer than a buffer acquisition time t, which elapses between acquisitions of a buffer, at least k times (where k denotes an arbitrary safety factor), a reacquisition of a buffer is performed by referring to the value contained in the buffer usage frequency table of the buffer usage reference memory 200 so that the optimization of buffers is achieved.

In the embodiment, it is assumed that the threshold value $\underline{a}$ and the safety factor $\underline{k}$ are held in the main memory 510.

When a buffer is acquired from the buffer storage area 500 in step 7, the buffer count monitoring part 110 checks the main memory 510 to see if there is any unused buffers therein. When it is determined that there is no unused buffers in the main memory 510, the extra buffer areas 520 and 530 are checked. The main memory 510 is checked first because it takes less time to acquire a buffer therefrom than from the extra buffer areas 520 and 530. It is of course possible to do without checking the main memory 510 and to immediately check the extra buffer areas 520 and 530 so as to acquire a buffer therefrom.

A description will now be given of a buffer control operation by giving a specific example.

Figure 7:
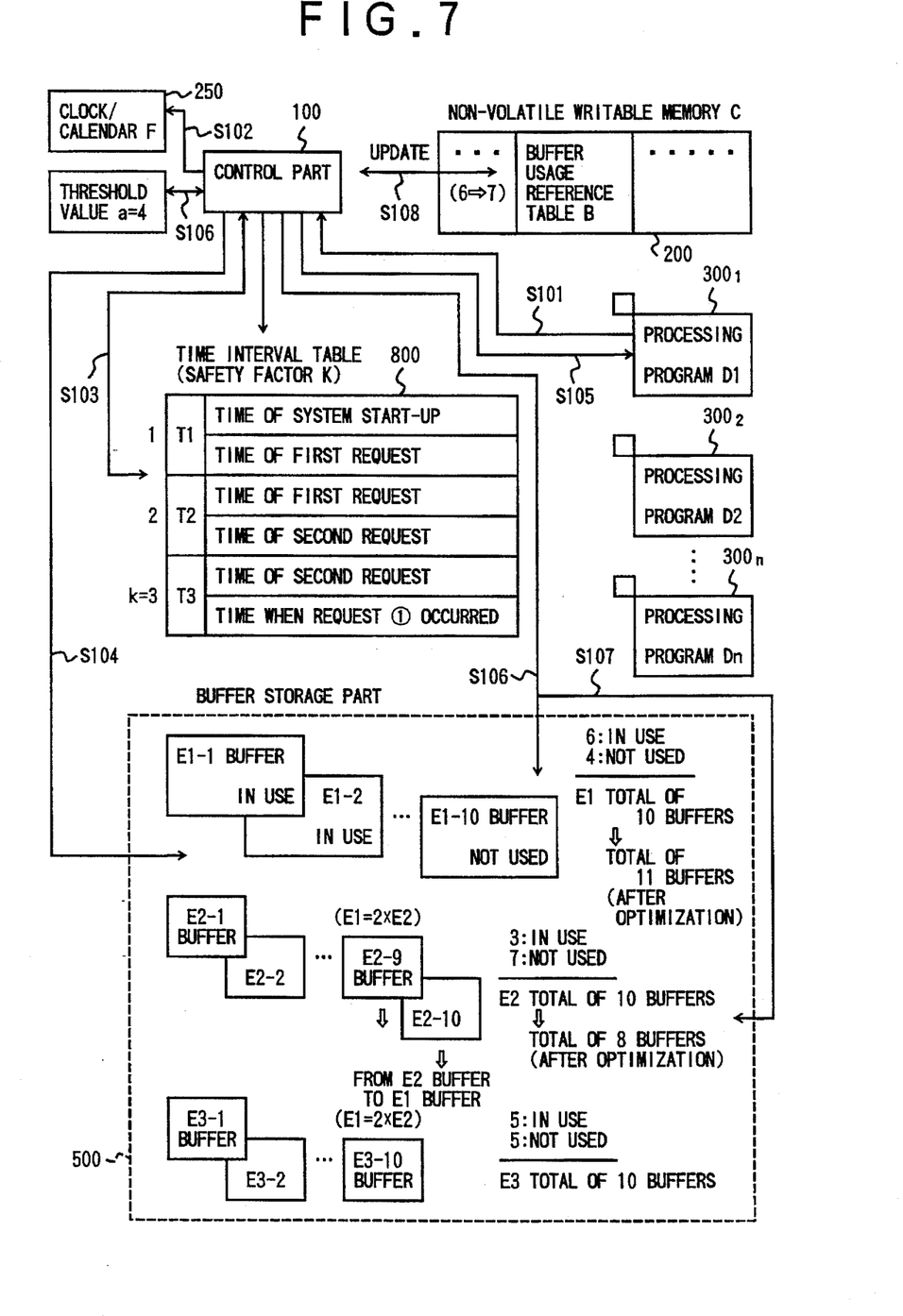
FIG. 7 is a diagram explaining the processing operation of the embodiment.
Figure 8:
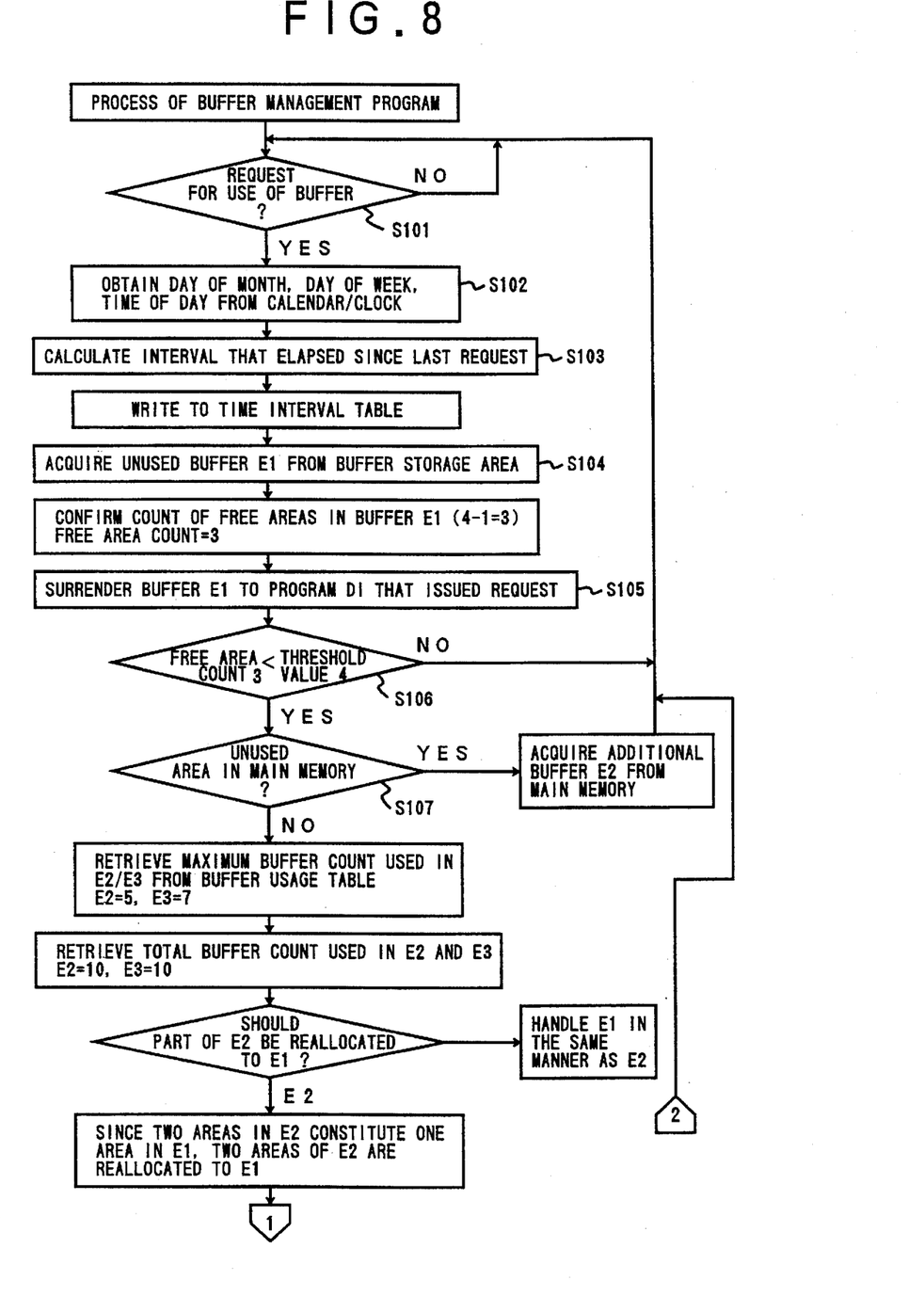
FIG. 8 is a flowchart (part 1) showing the processing operation of the embodiment.
Figure 9:
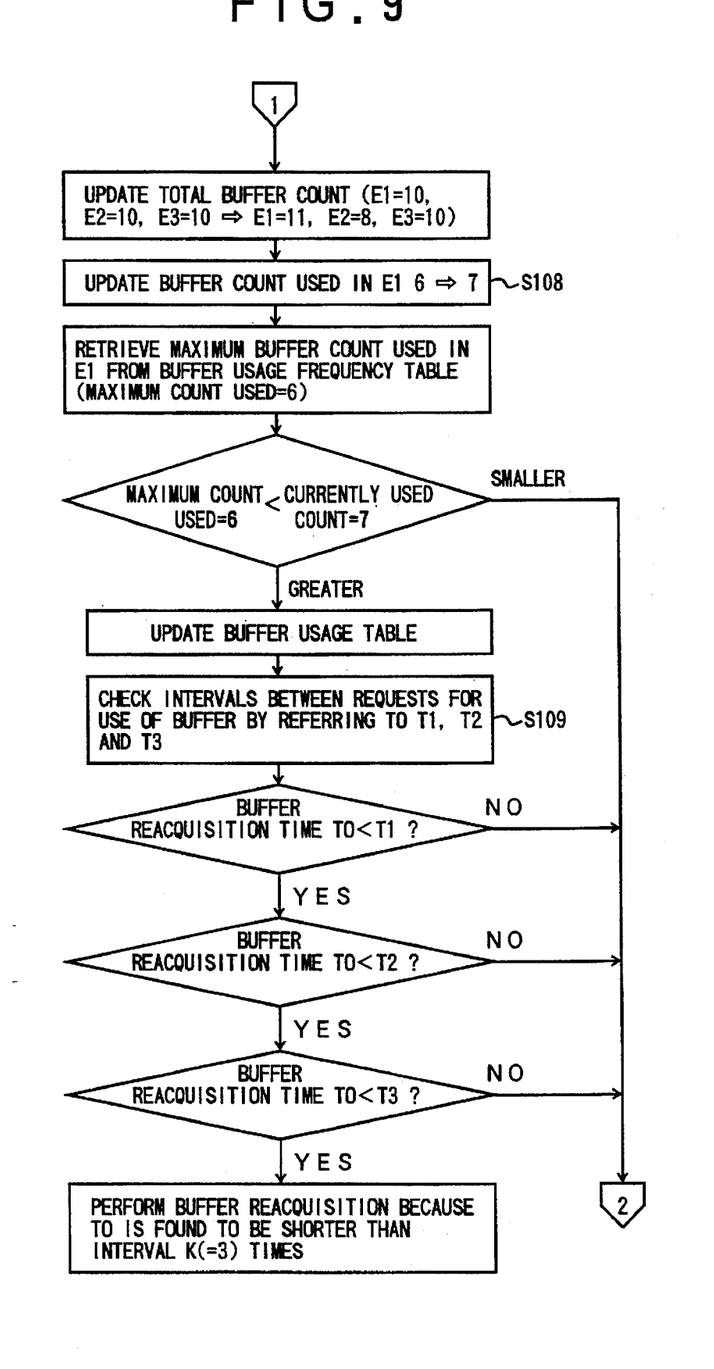
FIG. 9 is a flowchart (part 2) showing the processing operation of the embodiment.

FIG. 7 is a diagram explaining a specific processing operation of the embodiment; and FIGS. 8 and 9 are flowcharts showing the specific processing operation of the embodiment. In FIG. 7, those steps that are the same as the steps of FIGS. 8 and 9 are designated by the same reference numerals from, figure to figure.

Referring to FIG. 7, the buffer storage area 500 includes a buffer E1, a buffer E2 and a buffer E3. The buffer size of E1 is 60K bytes, the buffer E2 30K bytes and the buffer E3

20K bytes. In this embodiment, it is assumed that the threshold value for the count of free areas in a buffer is 4. In the example shown, the maximum buffer size used at a given time of day when a request is issued by the program 300 is 6 for the buffer E1, 5 for the buffer E2, and 7 for the buffer E3, the maximum buffer counts being stored in the buffer usage table in the buffer usage reference memory 200. The size of individual buffer areas is 6K bytes in the buffer E1, 3K bytes in the buffer E2, and 2K bytes in the buffer E3. Accordingly, each of the buffers E1–E3 has a total of 10 buffer areas. In this embodiment, it is assumed that the safety factor k =3 is employed.

Step 101) The program $300_1$ (see FIG. 2) issues, to the control part 100, a request for a use of the E1 buffer in the buffer storage area 500.

Step 102) The control part 100 obtains the day of the month, the day of the week and the time of day of the buffer usage request from the clock/calendar function 250.

Step 103) The control part 100 records an interval that elapsed since the last request in the time interval table 600. In the example shown in FIG. 8, the time of day when the buffer usage request occurred is written in T3 (see FIG. 7) in step 101. For example, if a second request was issued at 16:10, the 2nd day of the month, and the current request was issued at 18:10, the 2nd day of the month, the interval is 2 hours.

Step 104) The buffer count monitoring part of the control part 100 checks the buffer storage area 500 to see if there is a buffer that can be allocated to the program $300_1$. In the example of FIG. 7, 6 buffer areas are currently used, and 4 buffer areas are unused. The buffer count monitoring part 110 notifies the buffer acquiring part 120 that there are 4 unused buffer areas. The buffer count monitoring part 110 confirms the count of the free areas in the buffer E1. Since one of the 4 unused buffer areas will be used, there will be 3 buffer areas left unused in the buffer E1.

Step 105) Upon receipt of the notification from the buffer count monitoring part 110 that there is an unused area in the buffer E1, the buffer acquiring part 120 acquires the buffer E1, and the buffer access authorizing/surrendering part 130 surrenders the buffer E1 to the program $300_1$ requiring a use of a buffer.

Step 106) The buffer count monitoring part 110 compares the count of the free areas in the buffer E1 (which is now 3) with the threshold value stored in the main memory 510. Since the threshold value is 4 and the count of the free areas is 3, it is determined that an optimization is required.

Step 107) Since it has been determined that an optimization of buffers is required, the buffer count monitoring part 110 checks the main memory 510 to see if there is an unused buffer. When there is an unused buffer in the main memory 510, a buffer is acquired from the main memory 510. In this example, it is assumed that there is no unused buffer in the main memory 510. The buffer count monitoring part 110 obtains the maximum buffer counts used in the buffers E2 and E3 from the buffer usage table of the buffer usage reference memory 200. In this case, the maximum buffer count used is 5 in the buffer E2, and 7 in the buffer E3. The buffer count monitoring part 110 retrieves the total buffer counts of the buffers E2 and E3 of the buffer storage area 500. In this case, the count of the buffer E2 is 10 and the count of the buffer E3 is 10. The buffer count monitoring part 110 determines whether the buffer E2 or the buffer E3 is to be reallocated to the buffer E1. In this case, it is assumed that a part of the buffer E2 is reallocated to the buffer E1. Since the capacity of one buffer area in the buffer E2 is 3K bytes, two buffer areas are required to be reallocated to the buffer E1. While the total buffer counts were such that E1=10, E2=10 and E3=10 previously, they are modified such that E1=11, E2=8 and E3=10 by means of the buffer count monitoring part 110.

Step 108) The buffer count monitoring part 110 then updates the buffer count used in the buffer E1 in the buffer storage area 500, from 6 to 7. The buffer count monitoring part 110 further refers to the buffer usage table of the buffer usage reference memory 200 so as to compare the buffer count used in the buffer E1 with the value set in the buffer usage table. In this case, the buffer count used in the buffer E1 is 7 and the value stored in the buffer usage table is 6, the value in the buffer usage table is updated to 7.

Step 109) The buffer count monitoring part 110 checks the time interval table 600 storing the intervals between buffer usage requests by the program $300_1$. When an interval between buffer usage requests is found to be longer than a predetermined buffer acquisition time t, which elapses between acquisitions of a buffer, at least k=3 times (where k denotes an arbitrary safety factor), a reacquisition of a buffer is performed. The time interval table 600 stores the interval information in the following manner: a part T1 stores the time of day when the system was started and the time of day when there was the first request for a buffer; a part T2 stores the time of day when there was the first request and the time of day when there was the second request; and a part T3 stores the time of day when there was the second request and the time of day when the current request by the program $300_1$ for a user of a buffer occurred. Designating the buffer acquisition time as T0, it is determined that the safety factor k is cleared if T0<T1, T0<T2 and T0<T3. It is then possible to acquire a buffer on the basis of the maximum buffer count (=7, in this case) held in the buffer usage table. That is, if the buffer acquisition time is shorter than the interval held in the time interval table 600 a predetermined number of times, the reacquisition becomes possible. This prevents a buffer usage request from being issued by the program 300 when a buffer is being acquired.

If a non-volatile memory is used as the buffer reference memory 200, a possibility that the data stored is lost is eliminated even when there is a power failure or a malfunction. In this way, the integrity of the data relating to maximum buffer counts in correspondence with the day of the month, day of the week and the time of day is maintained so that reallocation of the buffers in the buffer storage area 500 is performed in a proper manner.

In the above described embodiment, when the control part 100 conducts a reallocation of buffers in the buffer storage area 500 to the program 300, a buffer is acquired from the main memory 510, if there is an unused buffer therein, so as to save the time required for the acquisition of the buffer, and, if there is no unused buffer in the main memory 510, a buffer is acquired from one of the extra buffers 520 and 530. However, the buffer reallocation procedure is not limited to this example. A buffer may be directly acquired from one of the extra buffers 520 and 530 without checking to see if there is an unused buffer in the main memory 510, for example, when the main memory 510 is scheduled to be used upon the loading of a different operating system. In case the extra buffers 520 and 530 are short of acquirable buffers, and the main memory 510 still has unused buffers, the buffer optimization using the main memory 510 may be performed after buffers are acquired from the other buffers 520 and 530.

While the buffer usage table of the buffer usage reference memory 200 holds information relating to the buffer count in use in relation to the day of the month, day of the week and the time of day, the usage information management is not limited to the style of this example. The buffer usage information may be tabulated in relation to individual users or programs.

The above described embodiment is configured such that there is provided a threshold value, and, when the count of the initially acquired buffers becomes smaller than the threshold value and a shortage of the free area in the buffer is expected, an optimization of buffers is performed. It is to be noted that the threshold value can be arbitrarily set to any one of the appropriate values at the design stage.

Preferably, the control part 100 of the above described embodiment is embodied by software means such that the buffer access authorizing/surrendering part 130, the buffer count monitoring part 110 and the buffer acquiring part 120 are embodied by subroutines.

As has been described, the present invention makes it possible to put stand-by buffers into use when there occurs a shortage of buffer size in the initially acquired buffer. Hence, no excessive acquisition of buffers occurs, while at the same time a shortage of the buffer size is prevented. Thus, an occurrence of a failure due to a shortage of buffers can be avoided.

Also the present invention can be adapted to a situation wherein there are repetitions and concentrations of executions of processes in terms of the day of the month, week of the day or the time of day such that, by providing the buffer usage table of the buffer usage reference memory for each of the relevant factors, it is possible to acquire or store an optimum buffer count in correspondence to each of the factors. For example, it is possible to allocate a buffer to a program in a time zone in which a relatively small count of buffers is used. Moreover, by storing the maximum buffer count needed by the program requiring a use of a buffer in the buffer usage table of the non-volatile memory, the necessary information remains held even when there is a power failure. Since the buffer usage table always stores the maximum buffer count used, it can be referred to when a program requests a use of a buffer at the same time of day on the same day of the month, so that the maximum buffer count is allocated to the program. Thus, there is no need to modify software each time a buffer usage request is issued.

The present invention is not limited to the above described embodiments, and variations and modifications may be made without departing from the scope of the present invention.

What is claimed is:

1. A buffer reallocation system for allocating a buffer to a program requiring use of a buffer, said program being one of a plurality of programs requiring use of a buffer, said buffer reallocation system comprising:

buffer storing means having buffers in a plurality of buffer storage areas;

buffer access authorizing/surrendering means for surrendering, in response to a usage request for use of a buffer from said program requiring use of a buffer, a buffer of said buffer storing means to said program requiring use of a buffer;

buffer count monitoring means for monitoring the number of used and unused buffers in a first buffer storage area of said plurality of buffer storage areas, for checking whether sufficient buffers are available in said first buffer storage area for said buffer usage request from said program requiring use of a buffer, buffer acquisition means for acquiring a buffer from said buffer storing means in response to receipt of a buffer allocation notification from said buffer count monitoring means;

said buffer count monitoring means issuing a buffer allocation enable notification to said buffer acquisition means when available buffers are sufficient for said buffer usage request; and, when available buffers are not sufficient for said buffer usage request, searching said first buffer storage area to make available buffers in said first buffer storage area that meet said buffer usage request by issuing a buffer allocation enable notification to said buffer acquisition means; determining a number of remaining buffers in said first buffer storage area; and, upon determining that the number of remaining buffers in said first buffer storage area is smaller than a predetermined number, issuing a notification to said buffer acquisition means to acquire buffers in a second buffer storage area of said plurality of buffer storage areas in said buffer storing means; and buffer acquisition history storing means for storing a maximum buffer count used respectively by each of said plurality of programs requiring use of a buffer through the buffer acquisition means.

2. The buffer reallocation system as in claim 1, wherein said buffer count monitoring means reallocates buffers in the buffer storing means when, on the basis of a time interval table for holding a history relating to time of day when said program requiring use of a buffer issued a request for use of a buffer and for holding intervals between requests for use of a buffer, a relationship $T0<t$, where $T0$ denotes a predetermined period of time and $t$ denotes said interval, has occurred a predetermined number of times consecutively.

3. The buffer reallocation system as claimed in claim 2, wherein said buffer count monitoring means refers to a maximum buffer count used, which count is stored in said buffer acquisition history storing means, when said buffer count monitoring means reallocates buffers, and issues a notification for notifying the buffer acquisition means that a maximum buffer count is acquired.

4. The buffer reallocation system as claimed in claim 1, wherein said buffer acquisition history storing means stores, with respect to each of predetermined categories, the maximum buffer count acquired by said program requiring a use of a buffer.

5. The buffer reallocation system as claimed in claim 4, wherein said buffer acquisition history storing means stores the maximum count of buffers acquired by said program and stores corresponding time information indicating a time at which buffers are acquired.

6. The buffer reallocation system as claimed in claim 5, wherein said buffer acquisition history means obtains the history of buffer acquisition by using a clock/calendar function.

7. The buffer reallocation system as claimed in claim 5, wherein said buffer count monitoring means refers, when there is a shortage of a buffer count even after a reallocation, to said buffer acquisition history storing means, and notifies said buffer acquisition means that a buffer is to be acquired at a time characterized by the lowest usage.

8. The buffer reallocation system as claimed in claim 1, said buffer count monitoring means compares, after a buffer reallocation, the maximum buffer count which is stored in said buffer acquisition history storing means, with the count of reallocated buffers, and then updates the maximum buffer count stored in said buffer acquisition history storing means by substituting the number of reallocated buffers for the old maximum buffer count when the number of reallocated buffers exceeds the old maximum buffer count.

9. The buffer reallocation system as claimed in claim 1, wherein said buffer acquisition history storing means is embodied by a non-volatile memory.

* * * * *